A. HEIMANN & L. FLATOW.
WEIGHT INDICATING MECHANISM.
APPLICATION FILED JUNE 26, 1907.

938,054.

Patented Oct. 26, 1909.
2 SHEETS—SHEET 1.

WITNESSES:

INVENTORS
Albert Heimann
& Leo Flatow
BY
their ATTORNEYS

A. HEIMANN & L. FLATOW.
WEIGHT INDICATING MECHANISM.
APPLICATION FILED JUNE 26, 1907.
938,054.
Patented Oct. 26, 1909.
2 SHEETS—SHEET 2.
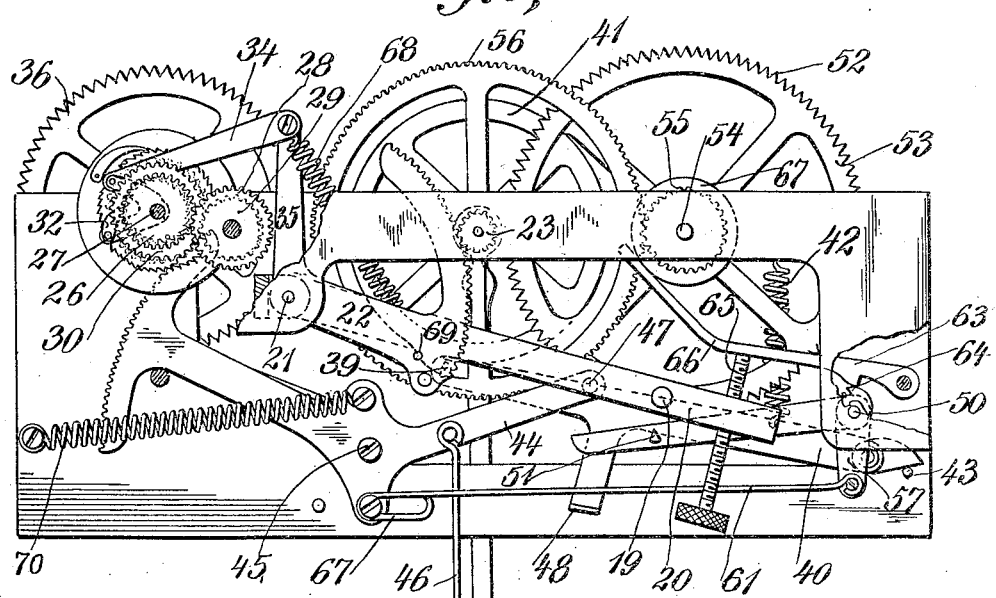
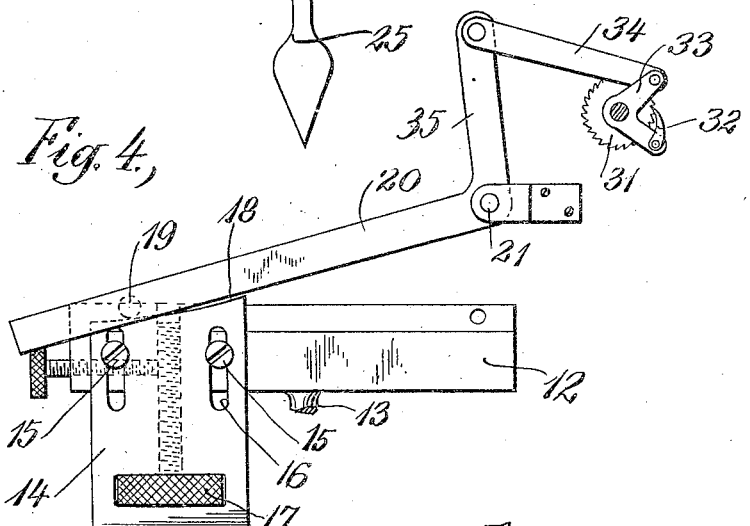
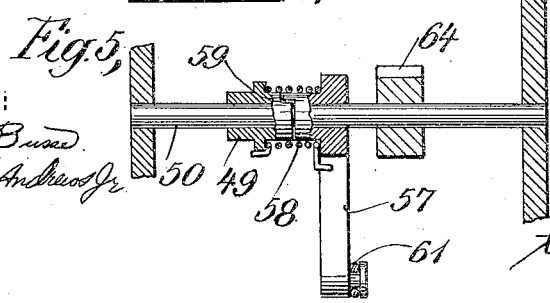
WITNESSES:
INVENTORS
Albert Heimann
& Leo Flatow
BY
their ATTORNEYS

UNITED STATES PATENT OFFICE.

ALBERT HEIMANN AND LEO FLATOW, OF NEW YORK, N. Y., ASSIGNORS, BY MESNE ASSIGNMENTS, TO DOUBLE VALUE VENDING COMPANY, OF NEW YORK, N. Y., A CORPORATION OF DELAWARE.

WEIGHT-INDICATING MECHANISM.

938,054.      Specification of Letters Patent.      Patented Oct. 26, 1909.

Application filed June 26, 1907. Serial No. 380,848.

*To all whom it may concern:*

Be it known that we, ALBERT HEIMANN, a citizen of the United States of America, and LEO FLATOW, a subject of the Emperor of Germany, residents of New York, county and State of New York, have invented certain new and useful Improvements in Weight-Indicating Mechanism, of which the following is a specification, reference being had to the accompanying drawings, forming a part thereof.

Our invention relates to improvements in indicating mechanism for weighing scales, and relates first to a peculiar form of stop employed between the weighing scales and the weight indicating mechanism, and second to improvements generally to weight indicating mechanism such as is commonly employed in weighing scales in which but a single weight is desired to be indicated for each operation of the mechanism.

The main objects of our invention are first to provide means for the correction of inequalities of expansion of weighing springs employed; and second to simplify indicating mechanism of the general character stated to provide for but a single indication for each operation of the machine, and to prevent the possibility of the mechanism being tampered with or manipulated in any way other than that for which it is especially designed.

In order that our invention may be fully understood we will now describe mechanism constituting an embodiment thereof, having reference to the accompanying drawings illustrating same, and will then point out the novel features in claims.

Figure 1:
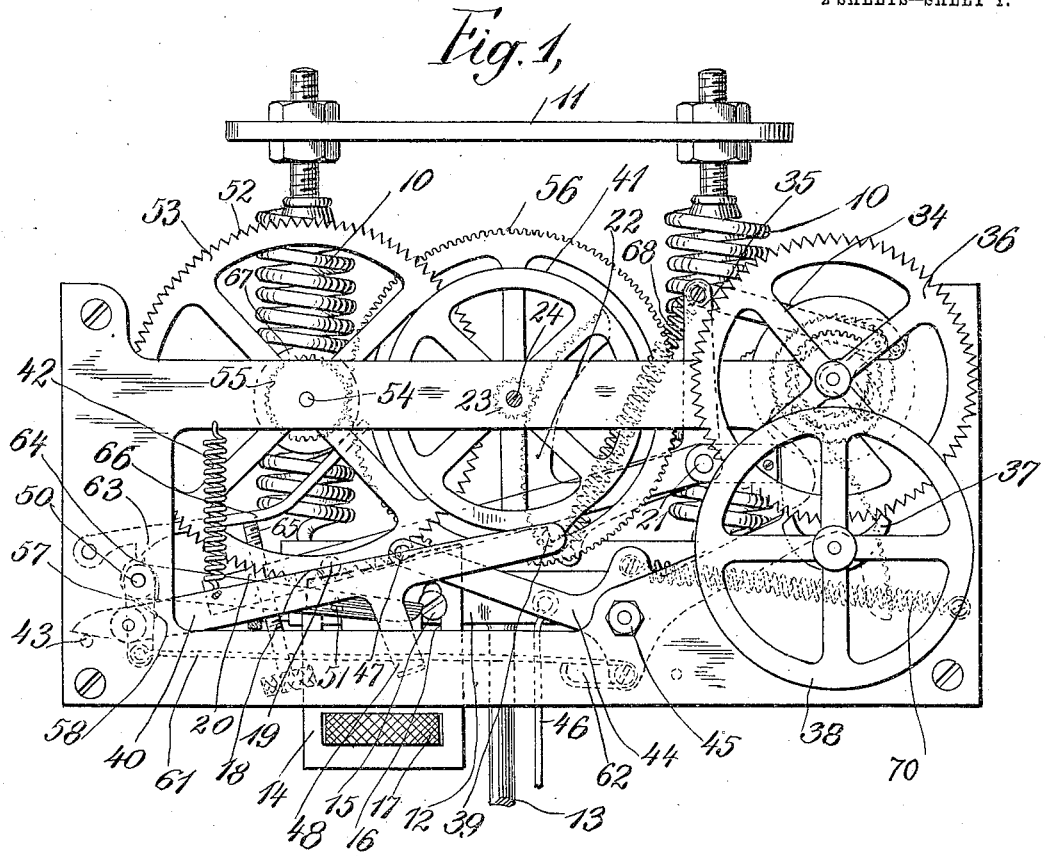
Figure 2:
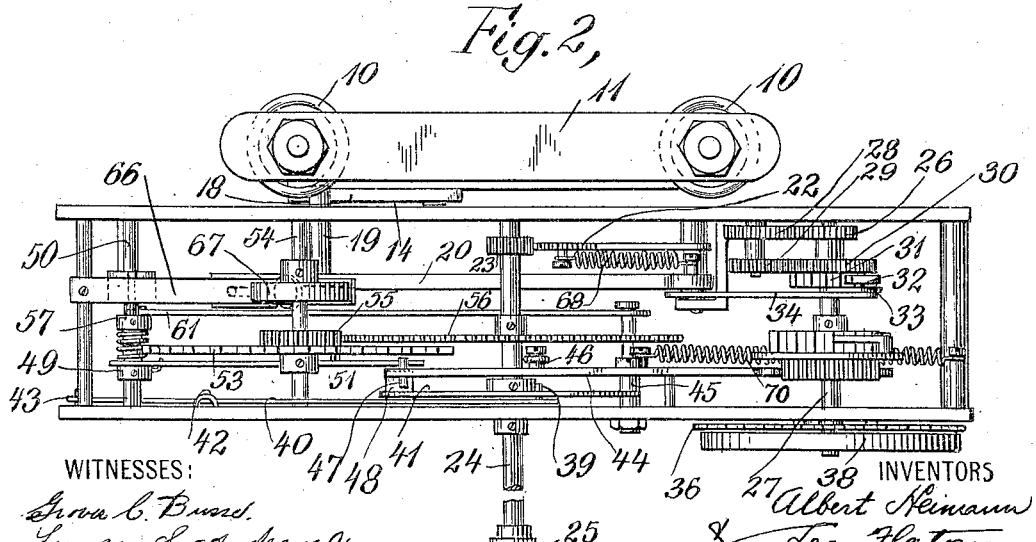

In the drawings: Figure 1 is a face view of such parts of a weighing machine and weight indicating mechanism therefor as are necessary to clearly illustrate our invention. Fig. 2 is a top view of the parts. Fig. 3 is a rear view of the same. Fig. 4 is a detached view of a gravity lever and adjustable stop employed in connection therewith. Fig. 5 is a detail view of certain parts.

The weighing mechanism includes springs 10, 10, secured at their upper ends to a stationary portion 11 of the frame of the machine, and connected at their lower ends to a cross head 12 from which a rod 13 leads to a platform or other device or mechanism for carrying the object to be weighed. The cross head 12 carries an adjustable stop 14, said adjustable stop secured to the cross head by means of set screws 15 which pass through slots 16 therein, a screw-threaded stud 17 being provided for bringing about such delicate adjustment as may be required. The upper surface of the stop 14 is curved, as appears at 18 in the drawing, said curved surface being arranged to co-act with a pin 19 carried by a gravity lever 20. This gravity lever is pivoted at 21 to a stationary portion of the machine, and carries with it a quadrant 22, the teeth of which are arranged in mesh with a pinion 23, said pinion secured upon the shaft or arbor 24 which carries the indicator 25. When a weight is carried by the rod 13 the springs 10 will be extended to an amount proportionate to the weight carried, and the stop 14 will be moved downward to just such an extent. This will permit the gravity lever 20 to fall to an extent limited by the co-action of the stop pin 19 with the curved surface 18, thereby moving the quadrant 22 and revolving the pinion 23, shaft 24 and indicator 25 to the proper degree to indicate the amount of such weight carried. It will be noted that the upper surface 18 of the stop 14 is irregularly curved. We have found in practice that, while, theoretically, springs of the character employed, stretch uniformly and in a predetermined ratio with regard to the weight applied thereto, in practice such stretching is often irregular. In manufacturing this mechanism we give this surface 18 a form in direct relation to the stretch of the particular springs with which the stop is to be employed, the surface being preferably laid out graphically as the springs are tested to carry progressive amounts of weight. The fact that the gravity lever 20 swings about a center to one side, and above the level, of the stop, also affects the shape of the surface 18 to a certain extent, as will be well understood, the stop pin 19 traveling upon the arc of a circle as it descends; but the very fact that enables us to compensate for inequalities of stretch of the spring is the traveling of the pin 19 and stop 14 in paths which are transverse with respect to each other.

In order to prevent the gravity lever from dropping too quickly, we have provided a time train comprising a pinion 26 mounted fast upon a shaft 27, back gears 28 and 29 secured together, the former being in mesh with the pinion 26, and a gear 30 in mesh with the back gear 29, said gear 30 being mounted loosely upon the shaft 27, but having secured thereto to rotate therewith a ratchet wheel 31. A pawl 32, carried by a lever 33, engages the teeth of the ratchet wheel 31, the said pawl-carrying lever 33 being connected by means of a link 34 with an arm 35 carried by the gravity lever 20. The teeth of the ratchet wheel 31 are so arranged that the pawl 32 will remain in mesh therewith while the lever 20 descends, and, in order that the lever may so descend, the gearing above mentioned must be rotated. Furthermore the shaft 27 has secured thereto near its outer end an escape wheel 36 which engages the pallet of an escapement 37, a balance wheel 38 being employed for the purpose of supplying the requisite inertia and momentum to oppose quick movement of the escapement. The ratchet and pawl mechanism 31 and 32 will, however, not oppose the return or lifting movement of the gravity lever 20, so that it may be readily returned to its normal position when the weight is removed and the springs are allowed to relax.

The indicator is normally held in its initial position by means of a stop pin 39 carried by a locking lever 40, which engages a projection upon a wheel 41 secured fast upon the shaft or arbor 24. This locking lever is normally held up in its position wherein the pin 39 will engage the abutment of the wheel 41 by means of a spring 42, a stop pin 43 upon the frame limiting the upward movement of the lever 40 so as to prevent the pin 39 from unduly bearing upon the periphery of the wheel 41, while the shaft or arbor 24 is rotating. This locking lever is released from its position by means of a tripping lever 44, said lever pivoted at 45 and provided with an operating rod 46 by which it may be rocked upon its pivotal support 45 when desired. A spring 70 operates to rock the tripping lever 44 in one direction, the operating rod being arranged to be pulled downward in order to operate it in the other direction and against the tension of the said spring 70. The said tripping lever is provided at one extremity with a pin 47, which is arranged, when the lever is moved far enough, to engage an abutment 48 carried by the locking lever 40, the said abutment 48 being arranged directly in the path of movement of the projecting pin 47. A downward pull upon the operating rod 46 will finally bring the pin 47 into engagement with the abutment 48, and will then move the locking lever 40 downward to cause it to disengage the wheel 41. Until this happens the indicating mechanism will not be allowed to be moved, even though a weight be applied to the rod 13 whereby to extend the springs and lower the stop 14. The pin is also arranged upon its downward movement to engage a lever 49, which is pivotally mounted at 50. The said lever carries a tooth 51 which at certain times is arranged to engage notches 52 in a wheel 53 secured to a shaft 54. The shaft 54 also carries a pinion 55, the teeth of said pinion arranged in mesh with the teeth of a spur gear 56 carried by the central indicator shaft or arbor 24. the lever 49 carries with it an arm 57, said arm being mounted fast upon the arbor or pivot pin 50, the lever 49 being loosely carried by such pivot pin, but the said arm 57 and lever 49 are normally maintained in a predetermined position with respect to each other by means of a coil spring 58 which forces the lever and arm toward each other in one direction, such movement, however, being limited by means of shoulders 59. Thus the lever 49 and arm 57 will normally move together as one integral structure, though, under strain, the parts may move independently.

With the parts in the position in which they are shown in Fig. 1, the lever 49 and arm 57 are allowed to drop by gravity to a position wherein the tooth 51 is entirely clear of the notches 52 in the wheel 53. The downward movement of the lever 49 is limited only by means of a link 61 which is pivotally connected at one end to the arm 57, and at the other end to a part of the tripping bar 44. At this end the connection is a slotted one, as shown at 62, whereby lost motion is permitted at certain times. When the tripping lever 44 is moved downward, and the pin 47 thereof engages the lever 49, as above stated, the lever is forced downward against the resistance of the spring 58, the arm 57 being at the same time pulled in a direction also opposed by the tension of the spring, by means of the link connection 61. This movement of the arm 57 brings a notch 64 in a collar or hub arranged fast upon the pivot pin 50, or otherwise secured to the arm 57, opposite the tooth of a pivoted latch 63, and the said latch will drop by gravity in position to hold the arm against return movement under the influence of the spring 58 when the pull upon the arm 57 is freed by a return movement of the tripping lever 44. As the tripping lever 44 is returned to a normal position, the lever 49 will be moved upward by the tension of the spring 58, until finally the tooth 51 carried thereby will be caused to engage one of the notches 52 of the wheel 53. As the tripping lever 44 finally completes its movement, thereby releasing tension upon the spring 58, the said lever 49 will still be kept in position to lock the wheel 53 by means of the said latch 63, until the latch is released, and it will be noted at this point that such freedom of movement is permitted by means of the slotted connection 62 between the link 61 and the tripping lever 44. The latch 63 is finally released by the engagement therewith of an adjustable screw 65 which is carried by the gravity lever 20; the final return movement, then, of the gravity lever 20 operating to effect the release of the lever 49 so as to unlock the wheel 53. The wheel 53 being, as before stated, connected through a train of gearing with the indicator 25, the locking of the wheel 53 prevents further movement of the indicator 25, so that all the time the wheel 53 is engaged by the tooth 51 the indicator 25 will be held stationary. Directly the latch 63 is raised, the lever 49 will drop by gravity to the position in which it is shown in the drawings, the lost motion in the slotted connection 62 being then taken up. The latch 63 has an extended end 66, which acts as a brake shoe to engage a brake drum 67 which is fast with the wheel 53. When the wheel 53 is released by the dropping of the lever 49, the said brake mechanism will frictionally hold the same so as to prevent accidental movement of the parts due to different causes, and to prevent overthrow movements thereof due to momentum.

In general the operation of the mechanism is as follows: The operating rod 46 is pulled all the way down by any suitable mechanism, or by hand if preferred. In so moving downward the stop pin 47 will first engage the lever 49, and will force same downward, without, however, thereby doing any work except the compressing of the spring 58, until finally the said pin 47 will engage the shoulder 48 of the locking lever 40, when the latter will be moved downward to thereby release the pin 39 from engagement with the wheel 41. The freeing of the wheel 41 permits the indicator to revolve, the said indicator being caused to revolve by the descent of the gravity lever 20. The said gravity lever will slowly descend, being caused to move thus slowly by the time train above described, until the said lever is finally brought to rest by the engagement of the stop pin 19 with the curved surface 18 of the stop 14. The amount of the weight suspended by the rod 13 will now be ascertained by the position of the indicator. In the meantime the operating rod 46, which will have been released immediately upon the completion of its downward movement, together with the tripping lever 44, will be returning slowly under the influence of the spring 70 to their initial position, the time mechanism above described compelling the slow return movement of these parts. The locking lever 40 will be released and permitted to move upward under the influence of its spring 42, so that the pin 39 will be in the path of the abutment of the wheel 41. During such upward movement the lever 49 will be gradually released, and, by the tension of the spring 58, will be caused to engage and lock the wheel 53, the latch 63 being allowed to drop into place against the notch or shoulder 64 to hold the said lever up in place. The indicator is now locked, so that weight cannot be again indicated except by another operation of the operating rod 46. Upon the final upward movement of the tripping lever 44, the link 61 will be so released as to permit the lever 49 to drop, and the said lever will then be caused to drop directly the gravity lever 20 is lifted to its normal position, the adjustable screw 65 lifting the latch 63 to free the lever, which will then drop by gravity. When the weight is removed from the rod 13, the gravity lever 20 will be lifted up to its normal position, and the indicator will be thereby returned to its initial position and with the shoulder on the wheel in engagement with the stop pin 39.

In order to prevent straining of the parts should the gravity lever be forced back to its initial position before the other parts have completed their movements, we have provided a spring connection between the gear segment 22 and the said gravity lever 20, such spring connection comprising a spring 68 secured to the arm 35 of the lever 20 at one end, and at the other end secured to the gear segment or quadrant 22, and a pin 69 arranged to operate as a limiting stop to limit the relative movements of the parts under the influence of the spring 68. If the indicator were locked at the moment the gravity lever was returned, against the tension of the spring 68, to its normal position, the said spring 68 would operate to move the quadrant to return the indicator to its initial position after it was finally released.

What we claim is:

1. In mechanism of the class described, the combination with a weight supporting element and an adjustable stop thereon, said stop arranged to have a pre-determined path of movement, of weight indicating mechanism including a pivoted lever having a part thereon arranged to engage the said stop, said part having a path of movement transverse with respect to the path of movement of the said stop, the said stop having a curved face to constitute compensating means, the curvature thereof being proportioned to cause a uniformly proportionate movement of rotation of the pivoted lever, with respect to a constant increase of load upon the weight supporting element.

2. In mechanism of the class described, the combination with a weight supporting member, a stop carried thereby, and a spring from which the weight supporting member is suspended, of weight indicating means including a pivoted lever having a portion adapted to engage the said stop, said stop having a curved face to constitute compensating means.

3. In mechanism of the class described, the combination with weighing means, of weight indicating mechanism comprising a gravity lever, indicating means operated thereby, a time train therefor, a locking device for said indicating means, a tripping lever for engaging and releasing said locking lever, and supplementary locking means for locking the indicating means during the return movement of certain of the parts.

4. In mechanism of the class described, the combination with weighing mechanism, of weight indicating means comprising a gravity lever arranged to engage a moving part of the weighing means, an indicator, means moving with the gravity lever and engaging the indicator, and an elastic connection between the said means and the said gravity lever.

ALBERT HEIMANN.
LEO FLATOW.

Witnesses:
D. HOWARD HAYWOOD,
C. F. CARRINGTON.